United States Patent
Schmid et al.

(10) Patent No.: US 11,371,486 B2
(45) Date of Patent: Jun. 28, 2022

(54) DETERMINING A BLADE BENDING MOMENT WITH TWO LOAD SENSORS PER ROTOR BLADE AND TAKING ROTOR DATA INTO CONSIDERATION

(71) Applicant: FOS4X GMBH, Munich (DE)

(72) Inventors: Markus Schmid, Munich (DE); Thomas Schauss, Gilching (DE)

(73) Assignee: FOS4X GMBH, Munich (DE)

( * ) Notice: Subject to any disclaimer, the term of this patent is extended or adjusted under 35 U.S.C. 154(b) by 94 days.

(21) Appl. No.: 16/631,138

(22) PCT Filed: Jul. 13, 2018

(86) PCT No.: PCT/EP2018/069143
§ 371 (c)(1),
(2) Date: Jan. 14, 2020

(87) PCT Pub. No.: WO2019/012132
PCT Pub. Date: Jan. 17, 2019

(65) Prior Publication Data
US 2020/0224640 A1    Jul. 16, 2020

(30) Foreign Application Priority Data
Jul. 14, 2017   (DE) .................... 10 2017 115 926.6

(51) Int. Cl.
*G01L 1/24* (2006.01)
*F03D 17/00* (2016.01)
*G01B 11/16* (2006.01)

(52) U.S. Cl.
CPC .............. *F03D 17/00* (2016.05); *G01B 11/16* (2013.01); *G01L 1/242* (2013.01)

(58) Field of Classification Search
CPC ....... F03D 17/00; F03D 1/0675; G01B 11/16; G01L 1/242; Y02E 10/72;
(Continued)

(56) References Cited

U.S. PATENT DOCUMENTS 9,316,571 B2 * 4/2016 Muller .................... G01N 3/20
9,353,727 B2 * 5/2016 Slot .......................... F03D 1/065
(Continued)

FOREIGN PATENT DOCUMENTS

CN          102197285 A       9/2011
DE       102005016524 A1    12/2005
(Continued)

OTHER PUBLICATIONS

German Examination Report application No. 102017115926.6, dated May 15, 2018.
(Continued)

*Primary Examiner* — Freddie Kirkland, III
(74) *Attorney, Agent, or Firm* — Moser Taboada

(57) ABSTRACT

The invention relates to an assembly for monitoring and/or controlling a wind turbine. The assembly includes a first strain sensor for measuring a first blade bending moment of a rotor blade of a wind turbine in a first spatial direction; a second strain sensor for measuring a second blade bending moment of a rotor blade of a wind turbine in a second spatial direction, which differs from the first spatial direction; an arrangement for determining constant components of forces and moments of the rotor blades provided in the wind turbine; and a controller for combining the first blade bending moment, the second blade bending moment and the constant components.

7 Claims, 5 Drawing Sheets

(58) Field of Classification Search
CPC ......... F05D 2270/807; F05D 2270/331; F05D 2270/808; F05D 2270/804
See application file for complete search history.

(56) References Cited

U.S. PATENT DOCUMENTS

| | | | | |
|---|---|---|---|---|
| 9,422,917 | B2* | 8/2016 | Hammerum | F03D 17/00 |
| 9,567,978 | B2* | 2/2017 | Marwaha | F03D 7/024 |
| 9,645,034 | B2* | 5/2017 | Eden | G01L 25/00 |
| 10,036,692 | B2* | 7/2018 | Perley | F03D 7/043 |
| 10,047,722 | B2* | 8/2018 | Vaddi | F03D 17/00 |
| 10,612,524 | B2* | 4/2020 | Caponetti | G01L 5/12 |
| 2012/0292905 | A1* | 11/2012 | Slot | F03D 17/00 290/44 |
| 2013/0298634 | A1* | 11/2013 | Eden | F03D 17/00 73/1.15 |
| 2014/0015251 | A1* | 1/2014 | Hammerum | F03D 7/0268 290/44 |
| 2015/0211969 | A1* | 7/2015 | Muller | F03D 17/00 73/849 |
| 2016/0115941 | A1* | 4/2016 | Marwaha | F03D 17/00 416/1 |
| 2018/0180029 | A1* | 6/2018 | Capon | G01L 5/12 |
| 2021/0199094 | A1* | 7/2021 | Mai | F03D 80/40 |

FOREIGN PATENT DOCUMENTS

| | | |
|---|---|---|
| DE | 202013007142 U1 | 10/2013 |
| DE | 102012108776 A1 | 3/2014 |
| DE | 102013007744 A1 | 11/2014 |
| EP | 2112375 A2 | 10/2009 |
| EP | 2354538 A1 | 8/2011 |
| WO | WO-2017000947 A1 | 1/2017 |

OTHER PUBLICATIONS

International Search Report Written Opinion for application No. PCT/EP2018/069143, dated Oct. 18, 2018.

* cited by examiner

DETERMINING A BLADE BENDING MOMENT WITH TWO LOAD SENSORS PER ROTOR BLADE AND TAKING ROTOR DATA INTO CONSIDERATION

TECHNICAL FIELD

Embodiments of the present invention are generally related to controlling and/or regulating or monitoring the operation of wind turbines. Embodiments are in particular related to devices and methods including strain measurement systems taking rotor data into account or measuring them.

PRIOR ART

Wind turbines are subjected to a complex control or regulation, which may be required, for example, by changing operational conditions. Furthermore, measurements are necessary for monitoring the state of a wind turbine. Due to the conditions linked with the operation of a wind turbine, for example, temperature variations, weather and meteorological conditions, but also in particular strongly varying wind conditions, as well as due the multitude of safety measures prescribed by law, monitoring and the sensors necessary for monitoring are subjected to a plurality of constraints.

Rotor blades may be equipped with strain sensors, acceleration sensors or further sensors in order to detect blade loads, accelerations or further physical measurement parameters. Blade bending moments are hitherto measured via load sensors provided in the rotor blade. Typically, four strain sensors are interconnected in the blade root in pairs in a half-bridge. It should be noted in this context that by additional sensors—exceeding two sensors—measurement uncertainties are intended to be minimized. For this purpose, the system is overdetermined with more than two load sensors. US 2009/0246019, for example, describes a measurement system composed of four strain sensors in the blade root for ice detection. The IEC61400-13 standard is the basis for measuring rotor blade bending moments in wind turbines. Here, it is described how the indirect measured value of the blade bending moments can be inferred from the direct measurement by strain sensors in the blade root and a corresponding calibration. For this purpose, four strain sensors in azimuthally opposing pairs are utilized for determining the moments. This arrangement suppresses the undesired constant components (centripetal force, temperature expansion, etc.) of the rotor blade acting upon the measurement. In addition, parasitic sensitivities of the sensors, such as, for example, to temperature, are compensated by such an arrangement.

In WO 2017/000960A1, a measurement system is described which is able to determine blade bending moments with only three strain sensors per rotor blade. In this case, the inventors look at the sensors independently from one another, wherein no pair formation is performed, which allows the sensors to be positioned azimuthally freely. The three sensors are in this case arranged such that there is no sensor pair at an angle of 0° or 180° relative to one another. Thus, the sensors each cover a part of the bending moments of the adjacent sensors.

One group of sensors seeming to promise success for further applications, are fiber optic sensors. It is therefore desirable to further improve measurements for monitoring a wind turbine with fiber optic sensors.

In general, it is therefore desirable to enable improvements in controlling and monitoring, in sensors for a rotor blade of a wind turbine, in rotor blades for wind turbines, and in wind turbines themselves.

SUMMARY OF THE INVENTION

According to one embodiment, an assembly for monitoring and/or controlling a wind turbine is provided. The assembly includes a first strain sensor for measuring a first blade bending moment of a rotor blade of a wind turbine in a first spatial direction; a second strain sensor for measuring a second blade bending moment of a rotor blade of a wind turbine in a second spatial direction, which differs from the first spatial direction; an arrangement for determining constant components of forces and moments of the rotor blades provided in the wind turbine; and a controller for combining the first blade bending moment, the second bending moment and the constant components.

According to another embodiment, a method for monitoring and/or controlling a wind turbine is provided. The method includes measuring bending moments of a rotor blade of the wind turbine in at least two different spatial directions; and measuring constant components of forces and moments of the rotor blades provided in the wind turbine; and monitoring and/or controlling the wind turbine by combining the blade bending moments and constant components.

BRIEF DESCRIPTION OF THE DRAWINGS

Exemplary embodiments are shown in the drawings and explained in more detail in the description below. In the drawings.

In the drawings, identical reference numerals denote identical or functionally identical components or steps.

MODES FOR CARRYING OUT THE INVENTION

Figure 1:
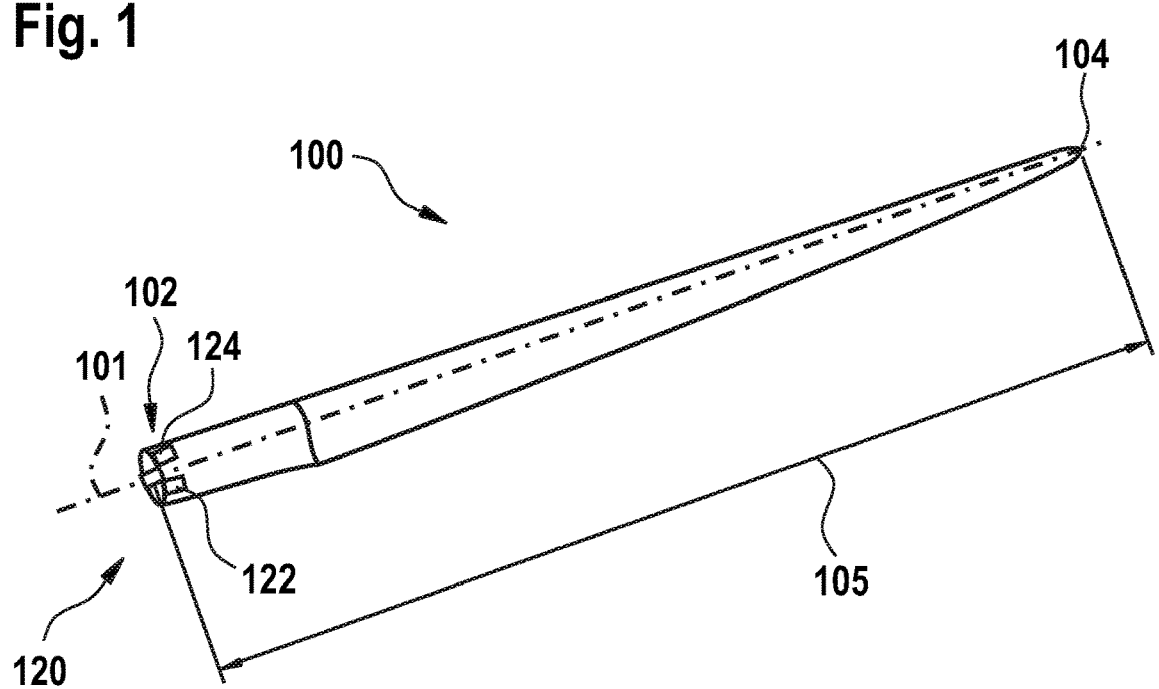
FIG. 1 schematically shows a rotor blade of a wind turbine with sensors according to embodiments described herein.

Hereinafter, more detailed reference is made to various embodiments of the invention, with one or more examples being illustrated in the drawings.

Blade bending moments in the rotor blade of a wind turbine can be utilized for many applications. These include, inter alia, individual pitch control of a rotor blade, load monitoring, peak load switch-off, the detection of rotor imbalance or wind field measurement.

Wind turbines can be monitored and regulated by measurement technological systems in the rotor blades. Moreover, one or more of the following applications may be implemented: individual pitch control of a rotor blade, buoyancy optimization of a rotor blade, load regulation of a rotor blade or the wind turbine, load measurement on a rotor blade or the wind turbine, determination of the state of components of the wind turbine, for example, determination of the state of a rotor blade, ice detection, lifetime estimation of components of the wind turbine, for example, a rotor blade, regulation based on wind fields, regulation based on trailing effects of the rotor, regulation of the wind turbine based on loads, regulation of the wind turbine with respect to adjacent wind turbines, predictive maintenance, tower clearance measurement, peak load switch-off, and detection of imbalance.

Embodiments of the present invention are related to a combination of strain sensors in the rotor blade of a wind turbine and the measurement or use of rotor data. According to embodiments described herein, the blade bending moments can be divided in two dimensions: the flapping direction and the swing direction. Through the knowledge of the blade pitch angle, the blade bending moments can be calculated in the rotor plane and perpendicular to the rotor plane. Moreover, the bending moments of the rotor and the bending moments of the tower coupled via the powertrain can be determined from the determined bending moments of the blades.

According to embodiments described herein, which can be combined with other embodiments, an assembly for monitoring and/or controlling a wind turbine is provided. The assembly includes a first strain sensor for measuring a first blade bending moment of a rotor blade of a wind turbine in a first spatial direction; a second strain sensor for measuring a second blade bending moment of a rotor blade of a wind turbine in a second spatial direction, which differs from the first spatial direction; an arrangement for determining constant components of forces and moments of the rotor blades provided in the wind turbine; and a controller for combining the first blade bending moment, the second bending moment and the constant components.

Measurement data hitherto detected by further load sensors in the rotor blade for precisely determining blade bending moments, are derived through rotor data. The rotor data comprise in this case, inter alia, the rotor angle, the rotor speed, the pitch angles and/or rotor vibrations. According to some embodiments, one or more rotor data items can be determined by one or more acceleration sensors, one or more gyroscope sensors, by one or more angular position encoders installed in the plant, or similar, or by a combination thereof. Embodiments of the invention allow an instrumentation of more than two load sensors in the rotor blade to be dispensed with while maintaining the precision.

According to further embodiments, which can be combined with other embodiments described herein, temperature-compensated strain sensors, for example, passive temperature-compensated strain sensors, in particular fiber optic temperature-compensated strain sensors, can be used for strain measurement. Temperature-compensated strain sensors, in particular passive temperature-compensated strain sensors are temperature invariant. They are provided with a sensor structure which is able to compensate for the thermal expansion of the blade material. This allows a higher precision to be achieved in determining blade bending moments.

FIG. 1 shows a rotor blade 100 of a wind turbine. The rotor blade 100 has an axis 101 along its longitudinal extension. The length 105 of the rotor blade reaches from the blade flange102 or blade root to the blade tip 104. FIG. 1 moreover shows an arrangement 120 of strain sensors or strain gauges. The arrangement 120 includes a first strain sensor 122 and a second strain sensor 124. This assembly will be explained in more detail with reference to FIGS. 3, 4A and 4B. The arrangement made up of two strain sensors can detect two different spatial directions, in particular the swing direction and the flapping direction.

The blade loads at a wind turbine are dominated by blade bending moments. The target is to determine the blade bending moments in the rotor blade in order to monitor or regulate them accordingly and thus to minimize them. Blade bending moments in general represent an indirect measurement parameter for measurement technology. According to the IEC 61400-13 standard for blade load measurement in wind turbines, the loads are determined indirectly through measuring the blade strains. The measured strains represent in this case the direct measurement parameter. Calibrating the measurement system allows the transmission function of the blade bending moments into strain signals to be determined. Forming the inverse function subsequently allows the blade bending moments to be inferred from the measured strain signals.

According to the IEC 61400-13 standard, the blade strains are determined by means of four strain sensors. The strain sensors are in this case applied to a blade radius having a sensitivity vector in parallel to the blade axis. The four strain sensors are arranged azimuthally in an angular grid of 90°, wherein ideally in each case two opposing sensors are oriented azimuthally at the rotor blade coordinate system in the swing direction and flapping direction. Due to the opposing sensors, a strain half-bridge is realized compensating for the temperature expansion of the substrate material in first order. In addition, temperature sensors are applied near the strain sensors in order to be able to compensate for temperature influences at the measurement object and the sensors.

Figure 2:
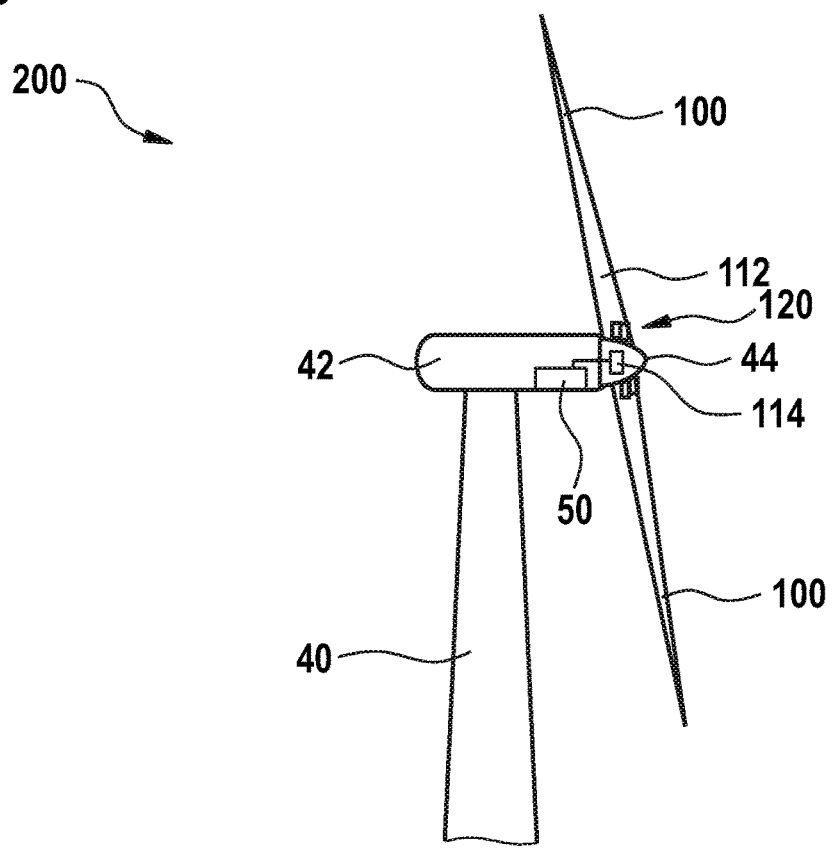
FIG. 2 schematically shows a part of a wind turbine with rotor blades and sensors according to embodiments described herein.

FIG. 2 shows a wind turbine 200. The wind turbine 200 includes a tower 40 and a nacelle 42. The rotor is attached to the nacelle 42. The rotor includes a hub 44 to which the rotor blades 100 are attached. According to typical embodiments, the rotor has at least two rotor blades, in particular three rotor blades. During the operation of the wind turbine, the rotor, i.e. the hub together with the rotor blades, rotates about an axle. In doing so, a generator is driven for generating electricity. As illustrated in FIG. 2, a rotor blade includes an arrangement 120 of strain sensors. The evaluation unit 114 delivers a signal to a controller and/or regulation unit 50 of the wind turbine 200.

According to some embodiments, which can be combined with other embodiments, the strain sensors are fiber optic strain sensors. For fiber optic strain sensors, an optical signal is transmitted to the evaluation unit 114 by means of a light guide, for example, an optical fiber. In a fiber optic strain sensor, the actual sensor element typically is provided within an optical fiber, for example, in the form of a fiber Bragg grating. This is described in detail with reference to FIGS. 5 and 6.

Figure 3:
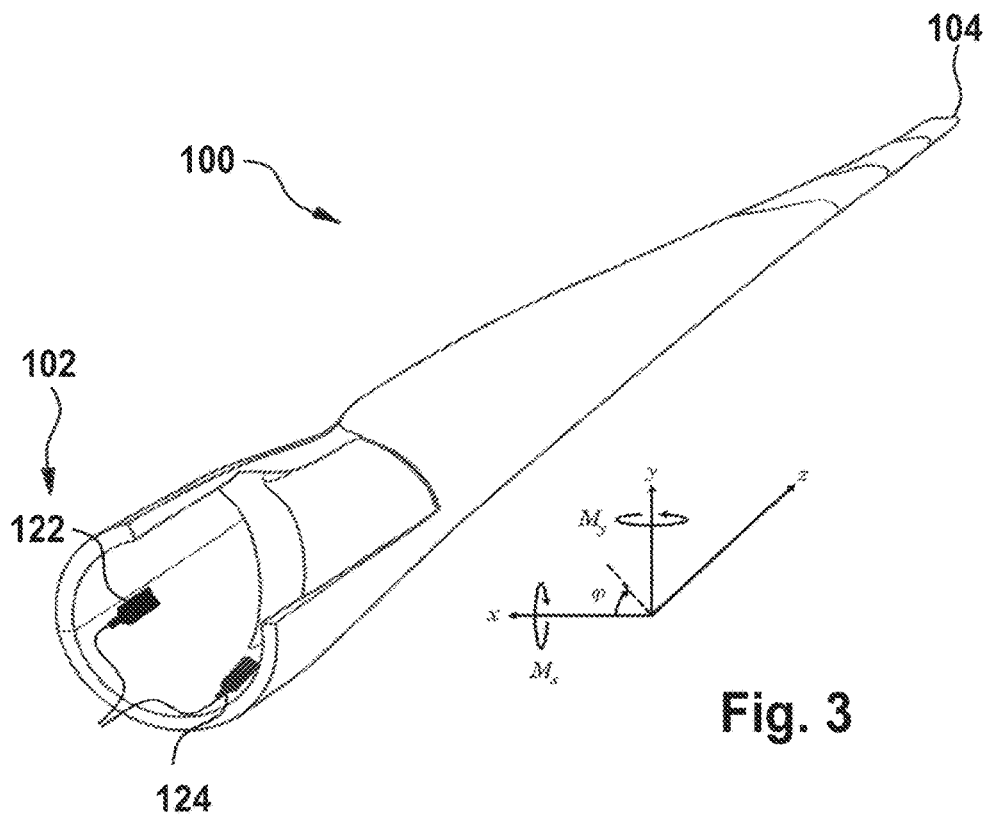
FIG. 3 schematically shows a rotor blade of a wind turbine with sensors according to embodiments described herein.

The embodiments and applications mentioned above may be enabled by a combination of strain sensors and rotor data. According to some embodiments described herein, two strain sensors are used as is illustrated in FIG. 3. For determining the blade loads, the strain sensors are utilized which are arranged such that the blade bending moments are reproduced in the flapping direction and swing direction in an optimum way. The constant components of the measurement will be compensated, for example, by a third sensor in the rotor or by rotor data based on other components.

Figure 4A:
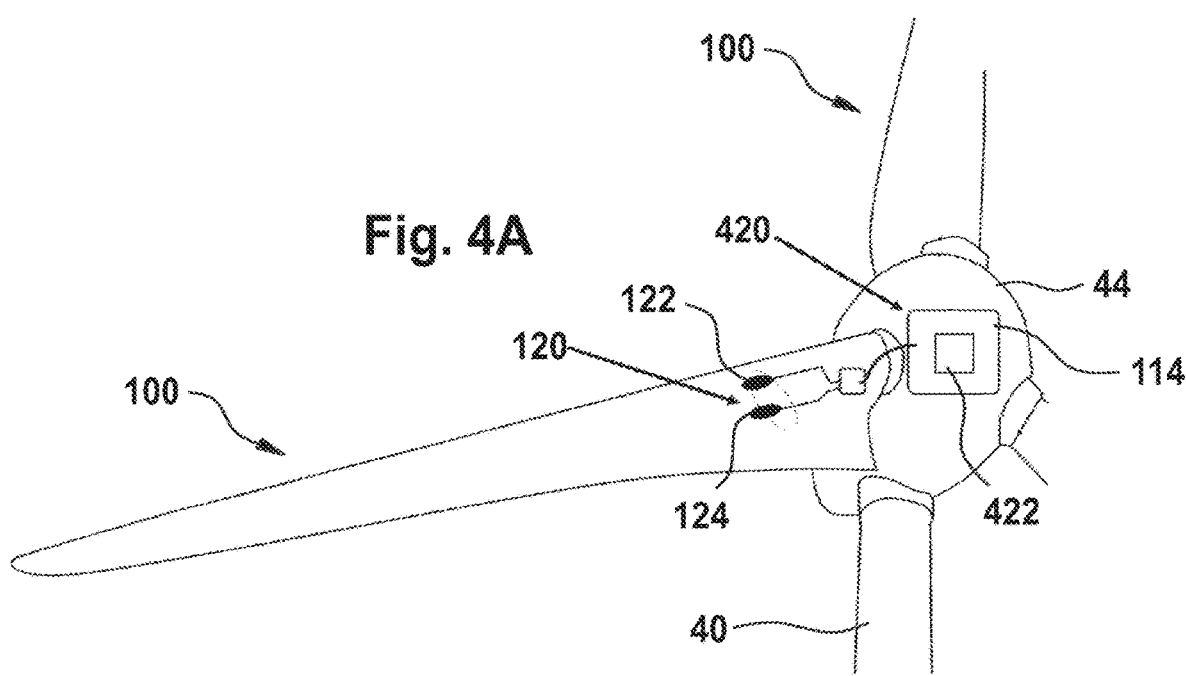
FIG. 4A schematically shows a part of a wind turbine with rotor blades and sensors according to further embodiments described herein.
Figure 4B:
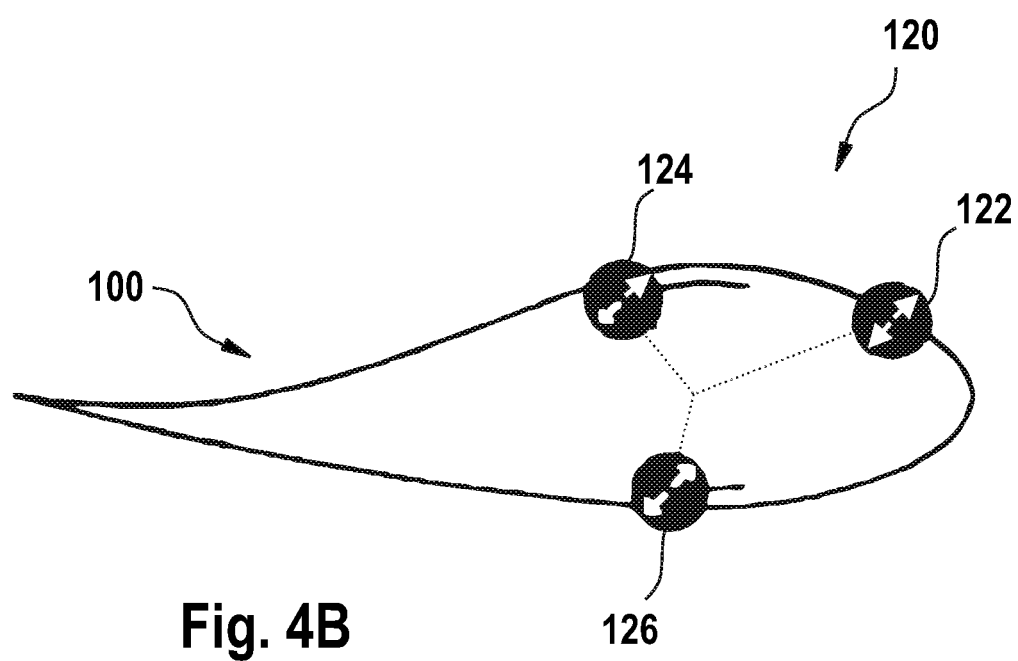
FIG. 4B schematically shows a cross-section of a rotor blade of a wind turbine with strain sensors.

According to some embodiments, as illustrated in FIG. 4B, for example, a further strain sensor may be provided in the rotor blade. The use of three strain sensors allows redundancy and thus increased safety against failures to be realized. According to embodiments described herein, it is moreover possible to use temperature-compensated strain sensors, in particular temperature-compensated fiber optic strain sensors. The use of temperature-compensated strain sensors allows the temperature influence on the determination of the blade bending moments to be minimized. Fiber optic strain sensors moreover enable high reliability of the blade bending moment determination due to their high peak load resistance and steady load resistance.

According to embodiments described herein, and as illustrated in FIG. 3 by way of example, two strain sensors are installed in the blade root 102 for determining the blade bending moments in the flapping and swing directions. A first strain sensor 122 can measure a bending moment in the X direction. A second strain sensor 124 can measure a bending moment in the Y direction. The strain sensors will be arranged such as to be, in the ideal case, azimuthally orthogonal to one another and thus cover the coordinate system of the rotor blade in the flapping and swing directions in an optimum way.

Sensors in the hub, see, for example, sensor 422 in FIG. 4A, allow, inter alia, the gravitational force and centripetal force acting upon the rotor blades to be inferred. The measurement parameters may be derived, for example, via additional sensors in the hub. For example, the sensor 422 may be an acceleration sensor and/or a gyro sensor. As an alternative or in addition, the measurement parameters for the rotor may be inferred via sensors present in the plant, for example, rotation angle encoders for pitch, power train, and azimuth.

If sensors such as acceleration sensors, for example, are used in the hub or the rotor blades, these allow the gravitational force and centripetal force acting upon the hub or rotor blades to be determined directly. The determination of rotor angle and rotor speed from acceleration signals accordingly is not required. If acceleration sensors are used in the rotor blades, a determination of the pitch angle is not required either.

Fusing or combining these data items allow the blade bending moments of the individual blade as well as the physical parameters of the entire rotor to be assessed. The use of the sensor data especially opens up a reduction of the sensors in the rotor blade.

According to embodiments described herein, an arrangement 120 of strain sensors, for example, a first strain sensor 122 and a second strain sensor 124 may be provided in a rotor blade. The arrangement 120 may be provided in or close to the blade root. The blade bending moments are measured in the swing direction and in the flapping direction, for example. A further arrangement 420 for measuring rotor data can be provided in the rotor hub 44 as illustrated in FIG. 4A by way of example. The arrangement 420 may include a sensor 422, for example, an acceleration sensor and/or a gyro sensor. Rotor data may be provided alternatively or additionally by signals contained in the wind turbine.

The arrangement 420 may determine constant components of forces and moments of the rotor blades. The measurement of the constant components of forces and moments in the rotor blades, for example, three rotor blades may be performed via a central sensor location in the hub, in the nacelle or at the power train. In conventional approaches, the constant components are obtained for each blade individually by means of respective additional sensors in the blade. The use of a central arrangement 420 for detecting rotor data or the use of rotor data of the wind turbine allows the rotor blade to be equipped with less sensors. Likewise, less measurement channels are required at the measurement amplifier of the bending moment measurement. Thus, a more cost-efficient system can be used for measuring, since sensors and a more complex installation in the rotor blade can be dispensed with or the sensors and the installation in the rotor blade can be reduced. Moreover, the installation time is shortened.

By mounting the sensors in the hub or in the nacelle, furthermore, complex lightning protection devices may be dispensed with, since these accordingly are located in a closed lightning protection zone. By referring to sensors already installed by the plant producer, such as rotation angle encoders for pitch, power train, azimuth, and further sensors such as temperature sensors, the installation of additional sensors may completely be dispensed with. Further costs and installation expenditures are hereby saved.

If acceleration sensors are available in the rotor blades, the signals of these acceleration sensors can be used for measuring the constant components of forces and moments. Further sensors in the hub or in the nacelle and a reference to further sensors of the plant producer, such as rotation angle encoders for pitch, power train, and azimuth may be dispensed with in this case.

Embodiments of the present invention for determining the blade bending moments reduce an overdetermination of the blade bending moment measurement in order to compensate for constant components of forces and moments. An overdetermination, which could be realized by additional sensors installed in all of the rotor blades, can be reduced. The arrangement 420 including sensors in the hub or on the power train or otherwise in the nacelle in order to compensate for constant components of forces and moments of the rotor blades, allows a more cost-efficient system to be provided. It is possible to determine the blade bending moments with only two strain sensors per rotor blade in the same quality as with several sensors per rotor blade.

FIG. 4B shows a cross-section of a rotor blade 100 and an arrangement of three strain sensors, wherein the strain sensors may be attached in the blade root or near the blade root, for example. According to some embodiments described herein, the three strain sensors may be attached in an angular grid of about 120°, with a deviation of ±20°, in particular ±10° being possible. Ideally, an azimuthal angular grid of 120° is used for covering the blade coordinate system. The azimuthal angle may be related to the coordinates in the blade root, for example, with a center point axis in parallel to the length of the rotor blade. This means that the azimuthal angle is related to a coordinate system of the rotor blade. The blade bending moments are realized via a reduced interconnection by means of three strain sensors:

In general, the blade bending moments can be determined by two strain sensors, for example, in the flapping direction and swing direction. According to the IEC 61400-13 standard, the blade strains are determined by means of four strain sensors. If the survival probabilities of a strain sensor are regarded statistically, three strain sensors will result in a significant increase of the survival probability of the entire system as compared to a system with two strain sensors. A further increase of the survival probability of the entire system by four sensors, however, is correspondingly low. An arrangement 120 of three strain sensors for determining blade bending moments of a rotor blade of a wind turbine thus offers a similarly high survival probability of the entire system for determining blade bending moments at reduced material expenditure and thus reduced energy generation costs. At the same time, three strain sensors allow the centripetal forces and constant components of temperature effects to be compensated for. According to typical embodiments, the strain sensors may be fiber optic strain sensors. Moreover, it is possible to use temperature-compensated sensors.

According to embodiments described herein, which can be combined with other aspects, details and embodiments, an assembly for monitoring and/or controlling a wind turbine is provided. The assembly includes a first strain sensor 122 for measuring a first blade bending moment of a rotor blade of a wind turbine in a first spatial direction; a second strain sensor 124 for measuring a second blade bending moment of a rotor blade of a wind turbine in a second spatial direction, which differs from the first spatial direction; and a third strain sensor, wherein the first strain sensor, the second strain sensor, and the third strain sensor in combination determine two bending moments.

Figure 5:
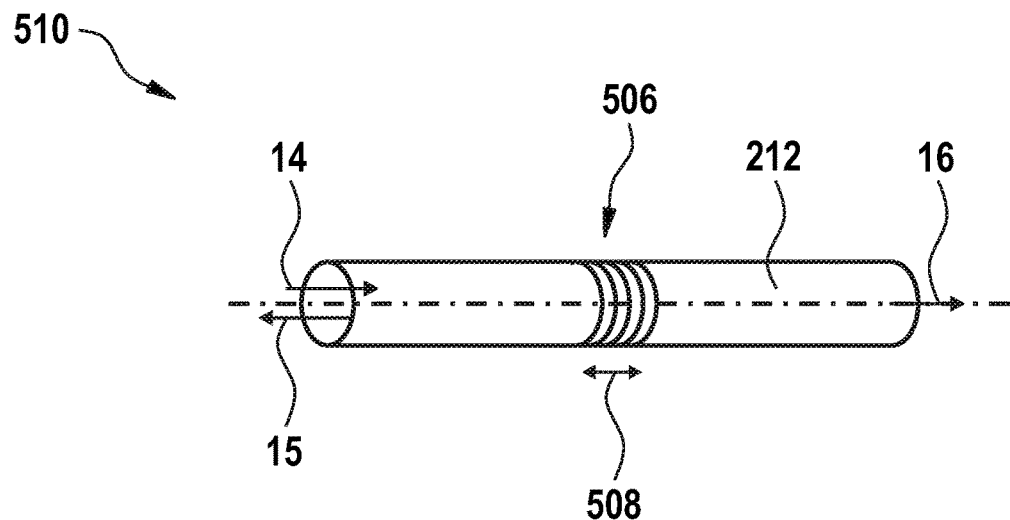
FIG. 5 schematically shows an optical fiber with a fiber Bragg grating for use in strain sensors according to embodiments described herein.

FIG. 5 shows a sensor or fiber optic sensor 510 integrated into an optical waveguide and featuring a fiber Bragg grating 506. Although only one single fiber Bragg grating 506 is shown in FIG. 5, it is to be understood that the present invention is not restricted to acquire data from a single fiber Bragg grating 506, but that a plurality of fiber Bragg gratings 506 can be arranged along a light guide 212, a transmission fiber, a sensor fiber or an optical fiber.

FIG. 5 thus only shows a portion of an optical waveguide formed as a sensor fiber, an optical fiber or a light guide 212, wherein this sensor fiber is sensitive to fiber strain (see arrow 508). It should be noted at this point that the expression "optical" or "light" is intended to indicate a wavelength range in the electromagnetic spectrum, which can extend from the ultraviolet spectral range via the visible spectral range up to the infrared spectral range. An average wavelength of the fiber Bragg grating 506, i.e. a so-called Bragg wavelength λB is obtained by the following equation:

$$\lambda B = 2 \cdot nk \cdot \Lambda.$$

In this case, nk is the effective refractive index of the basic mode of the core of the optical fiber, and Λ is the spatial grating period (modulation period) of the fiber Bragg grating 506.

A spectral width given by the full width at half maximum of the reflection response depends on the expansion of the fiber Bragg grating 506 along the sensor fiber. Due to the effect of the fiber Bragg grating 506, light propagation within the sensor fiber or the light guide 212, for example, is dependent on forces, moments and mechanical tensions and temperatures applied to the sensor fiber, i.e. the optical fiber, and in particular the fiber Bragg grating 506 within the sensor fiber.

As shown in FIG. 5, electromagnetic radiation 14 or primary light enters the optical fiber or the light guide 112 from the left, with a part of the electromagnetic radiation 14, as transmitted light 16, exiting with a wavelength progress that is changed as compared to the electromagnetic radiation 14. Furthermore, it is possible for reflected light 15 to be received at the input end of the fiber (i.e. at the end, where the electromagnetic radiation 14 is also irradiated), with the reflected light 15 likewise featuring a modified wavelength distribution. According to the embodiments described herein, the optical signal used for detecting and evaluating may be provided by the reflected light, by the transmitted light, and a combination of both of them.

In a case, where the electromagnetic radiation 14 or the primary light is irradiated in a wide spectral range, a transmission minimum will result in the transmitted light 16 at the place of the Bragg wavelength. In the reflected light, a reflection maximum will result at this place. Detecting and evaluating the intensities of the transmission minimum or the reflection maximum, or of intensities in corresponding wavelength ranges, will generate a signal, which can be evaluated with respect to the length change of the optical fiber or the light guide 112 and is thus indicative of the forces or vibrations.

Figure 6:
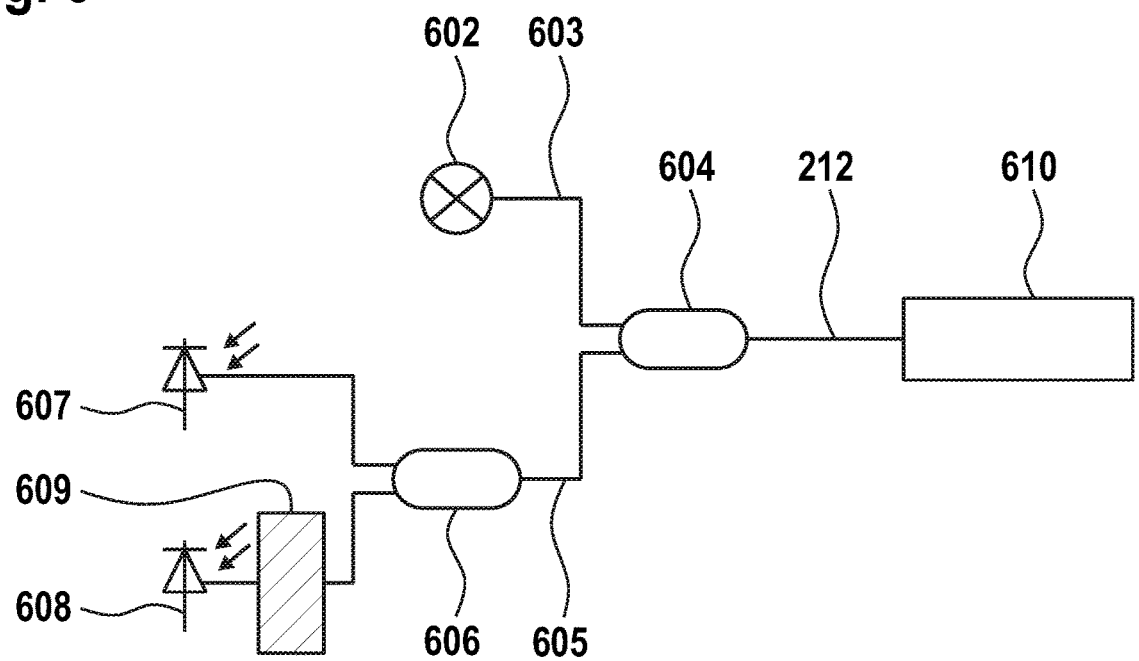
FIG. 6 schematically shows a measurement setup for a fiber optic strain sensor according to embodiments described herein or for methods for monitoring and/or controlling and/or regulating according to embodiments described herein.

FIG. 6 shows a typical measurement system for evaluating fiber optic and other strain sensors. The system features a source 602 of electromagnetic radiation, for example, a primary light source. The source serves for providing optical radiation, by means of which at least one fiber optic sensor element of a sensor, for example, a strain sensor, can be irradiated. For this purpose, an optical transmission fiber or a light guide 603 is provided between the primary light source 602 and a first fiber coupler 604. The fiber coupler couples the primary light into the optical fiber or the light guide 112. The source 602 may be, for example, a broadband source of light, a laser, an LED (light emitting diode), an SLD (superluminescent diode), an ASE source of light (amplified spontaneous emission source of light) or an SOA (semiconductor optical amplifier). Several sources of the same or a different type (see above) may also be used for embodiments described herein.

The fiber optic sensor element 610 such as a fiber Bragg grating (FBG) or an optical resonator, for example, is integrated into a sensor fiber or optically coupled to the sensor fiber. The light reflected from the fiber optic sensor elements is in turn guided via the fiber coupler 604, which guides the light via the transmission fiber 605 to a beam splitter 606. The beam splitter 606 splits the reflected light for detection by means of a first detector 607 and a second detector 608. On this occasion, the signal detected on the second detector 608 is first filtered by means of an optical edge filter 609.

The edge filter 609 allows a shift of the Bragg wavelength at the FBG or a wavelength change due to the optical resonator to be detected. In general, a measurement system as illustrated in FIG. 6 may be provided without the beam splitter 606 or the detector 607. The detector 607, however, enables the measurement signal of the strain sensor to be standardized with respect to other intensity fluctuations, such as fluctuations in the intensity of the source 602, fluctuations by reflections at interfaces between individual light guides, or other intensity fluctuations, for example. This standardization improves the measurement accuracy and reduces the dependence of measurement systems on the length of the light guides provided between the evaluation unit and the fiber optic sensor.

In particular when several FBGs are used, additional optical filter means (not shown) may be provided for filtering the optical signal or secondary light. An optical filter means 609 or additional optical filter means may comprise an optical filter selected from the group consisting of a thin film filter, a fiber Bragg grating, an LPG, an arrayed waveguide grating (AWG), an Echelle grating, a grating array, a prism, an interferometer and any combination thereof.

Figure 7:
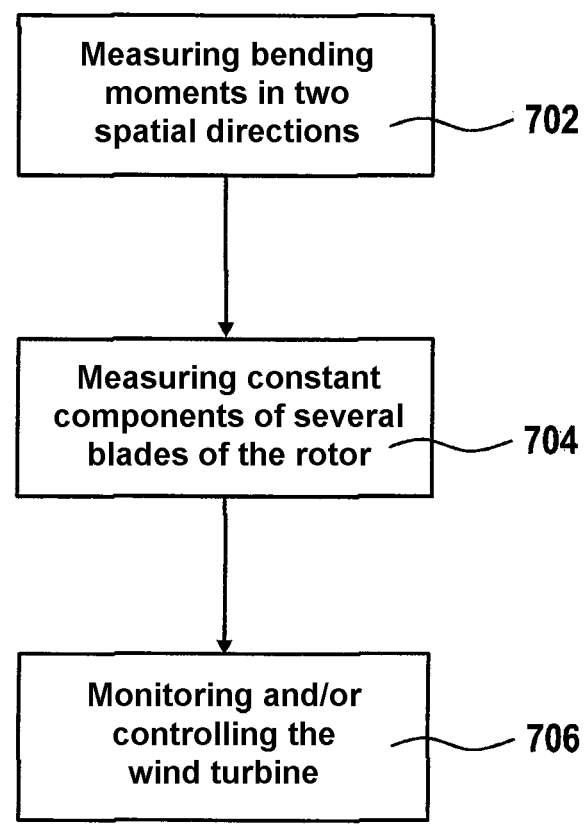
FIG. 7 shows a flow chart of a method for monitoring and/or controlling and/or regulating wind turbines according to embodiments described herein.

A further aspect in monitoring wind turbines, which can be combined with other embodiments and aspects described herein, but which is also provided independently of further embodiments, aspects and details, is an improved method for monitoring and controlling and/or regulating a wind turbine by means of vibration sensors and strain sensors, in particular fiber optic vibration sensors and fiber optic strain sensors. One or more of the following applications may be implemented: individual pitch control of a rotor blade, buoyancy optimization of a rotor blade, load regulation of a rotor blade or the wind turbine, load measurement on a rotor blade or the wind turbine, determination of the state of components of the wind turbine, for example, determination of the state of a rotor blade, ice detection, lifetime estimation of components of the wind turbine, for example, a rotor blade, regulation based on wind fields, regulation based on trailing effects of the rotor, regulation of the wind turbine based on loads, regulation of the wind turbine with respect to adjacent wind turbines, predictive maintenance, tower clearance measurement, peak load switch-off, and detection of imbalance. According to such an aspect or such an embodiment, a method for monitoring or controlling and/or regulating a wind turbine is provided. The method includes measuring bending moments of a rotor blade of the wind turbine in at least two different spatial directions (see reference numeral 702 in FIG. 7); measuring constant components of forces and moments of rotor blades provided on the wind turbine (see reference numeral 704 in FIG. 7); and monitoring and/or controlling the wind turbine by the combination of blade bending moments and constant components (see reference numeral 706 in FIG. 7).

Although the present invention has been described above on the basis of typical embodiments, it is not restricted thereto but can be modified in a number of ways. The invention is not restricted to the mentioned options of application either.

The invention claimed is:

1. An assembly for at least one of monitoring and controlling a wind turbine, comprising:
    a first strain sensor for measuring a first blade bending moment of a rotor blade of the wind turbine in a first spatial direction;
    a second strain sensor for measuring a second blade bending moment of the rotor blade of the wind turbine in a second spatial direction, which differs from the first spatial direction;
    an arrangement for determining constant components of forces and moments of the rotor blades provided in the wind turbine; and
    a controller for combining the first blade bending moment, the second blade bending moment and the constant components, wherein,
    for determining the constant components, the arrangement comprises a sensor, and
    the arrangement is provided in a hub or a nacelle of the wind turbine.

2. The assembly according to claim 1, wherein the first spatial direction and the second spatial direction enclose an angle of 70° to 110°.

3. The assembly according to claim 1, wherein the first strain sensor and the second strain sensor are arranged in an azimuthal angular grid of about 90°.

4. The assembly according to claim 1, moreover comprising:
    at least one third strain sensor, wherein the first strain sensor, the second strain sensor, and the third strain sensor in combination determine two bending moments.

5. The assembly according to claim 1, wherein the first and second strain sensors are fiber optic strain sensors.

6. The assembly according to claim 1, wherein the first and second strain sensors are arranged in an area of a blade root.

7. A method for at least one of monitoring and controlling a wind turbine, comprising:
    measuring blade bending moments of a rotor blade of the wind turbine in at least two different spatial directions;
    measuring constant components of forces and moments of the rotor blades provided in the wind turbine; and
    at least one of monitoring and controlling the wind turbine by combining the blade bending moments and constant components,
    wherein the constant components of the forces and moments of two or more rotor blades are measured by a sensor.

* * * * *